(No Model.)
A. C. DOSTER.
ADVERTISING DEVICE.
No. 553,555. Patented Jan. 28, 1896.
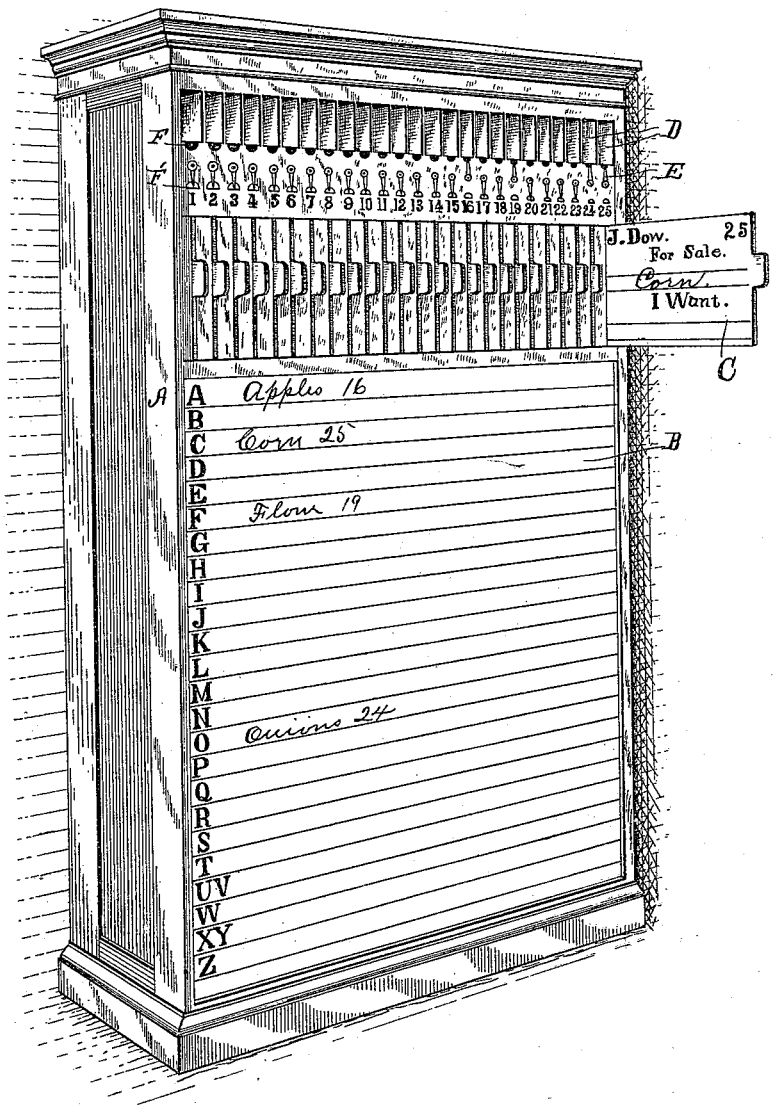
Witnesses:
Inventor,
Albert C. Doster
By Fred L Chappell
Atty.

UNITED STATES PATENT OFFICE.

ALBERT C. DOSTER, OF BROUARD, MICHIGAN.

ADVERTISING DEVICE.

SPECIFICATION forming part of Letters Patent No. 553,555, dated January 28, 1896.

Application filed June 14, 1895. Serial No. 552,791. (No model.)

*To all whom it may concern:*

Be it known that I, ALBERT C. DOSTER, a citizen of the United States, residing at the village of Brouard, in the county of Barry and State of Michigan, have invented certain new and useful Improvements in Advertising Devices, of which the following is a specification.

My invention relates to advertising devices, and is especially designed to facilitate exchanges in small towns or country places, but is also adapted for use in particular lines in large cities. Owing to the method of its operation, I call my improved device a "business-register," where opportunities for doing business are registered for the inspection of the parties interested.

The object of my invention is to provide a convenient means of notifying the public of the wants and desires of the individual, so as to facilitate the supplying of the same.

I accomplish the object of my invention by the device shown in the accompanying drawing.

Referring to the lettered parts of the same, A represents a suitable cabinet-case in which is supported a series of slides C side by side, which are constructed of slate, blackboard, or any suitable material on which matter can be written and easily erased. These slides are all numbered by suitable numbers above. The slides in this section are twenty-five in number. Above each slide is a little pigeon-hole D, and between the pigeon-holes and slides are little indicator-pointers E. These point to the black marks F above or to the white marks F' below.

In using my device, a slide is sold or rented to each individual who desires to advertise in this way, and on this slide his name is affixed. The slide is divided up into appropriate spaces headed "For sale," "I want to buy," "I wish to exchange," or similar headings, as desired. The slides are numbered. The numbers appear just above the slide on the case and also on the slide itself.

The owner of the slide writes upon the same the articles he may have for sale and the names of the articles which he desires to buy, or marks a list of articles he desires to exchange and what he wishes in exchange. After these memoranda are marked upon his slide, he refers to the index B below and marks thereon opposite the appropriate letter the articles which he has marked upon his slide and marks the number of his slide after the same. When he has this written on his slide, he turns the pointer E up to indicate that there is matter of business marked upon his particular slide so that any one interested may draw out his slide and find at once what the owner may desire in a business way.

To illustrate the use of this device, I will refer to the drawing. It will be noted that the slide 25 is drawn out, on which is marked "J. Dow," the owner. Under the title "For sale," he has marked "Corn," and on the index he has marked opposite C the word "Corn" and the number of his slide, 25. When the slide is drawn out, it is seen at once who the party is and all necessary information is obtained. Examining the index, it will be noted that under A appear the word and number "Apples—16." By drawing out the slide 16 information concerning that article can be obtained. Similarly, the words "Flour" and "Onions" appear opposite their suitable index-letters, the numbers of their slides being 19 and 24, respectively, and on these slides 16, 19, 24 and 25 are business items.

It will be noted that the pointers by said numbers are pointed up so that any one desiring complete knowledge of what is advertised will only draw out the slides so indicated and take notes of what interests him. Where the items are too numerous or the information too voluminous to be contained on the slides, it can be written on appropriate sheets or in a letter and slipped into the pigeon-hole D above the particular slide. It will thus be seen that this device is a very simple contrivance for securing complete knowledge of business transactions that are desired in the entire community, and will thus afford a ready means of facilitating the exchanges and supplying the wants and desires of the advertisers.

I desire to state that my improved business-register can be considerably varied in its details of construction without departing from my invention.

Having thus described my invention, what I claim as new, and desire to secure by Letters Patent, is—

1. In an advertising device, a cabinet, A, containing the numbered slides, C, adapted to fit in suitable apartments bearing similar numbers; indicators, E, above said slides; and a suitable index below for making reference to the tablets or slides above, as specified.

2. In an advertising device, a cabinet, A, containing numbered slides, C, adapted to fit in suitable apartments bearing similar numbers; indicators, E, above said slides; apartments, D, above said indicators; and a suitable index for making reference to the matter on the tablets or matter contained in the apartment, D, as specified.

3. In an advertising device, numbered slides bearing the names of the advertisers of appropriate size for stating the wants; numbered sections to receive said slides; a suitable indicator by each slide and an index for referring to the subject matter on said slides to facilitate the exchange of knowledge of wants or desires, as specified.

In witness whereof I have hereunto set my hand and seal in the presence of two witnesses.

ALBERT C. DOSTER. [L. S.]

Witnesses:
ROBERT BURCHETT,
OREN DAYTON.